(12) United States Patent
MacArthur et al.

(10) Patent No.: US 6,904,541 B1
(45) Date of Patent: Jun. 7, 2005

(54) METHODS AND APPARATUS FOR PROVIDING POWER TO ELECTRONIC CIRCUITRY (75) Inventors: Robert MacArthur, Leominster, MA (US); Brian Gallagher, Southborough, MA (US); Lawrence Pignolet, Mapleville, RI (US)

(73) Assignee: EMC Corporation, Hopkinton, MA (US)

( * ) Notice: Subject to any disclaimer, the term of this patent is extended or adjusted under 35 U.S.C. 154(b) by 569 days.

(21) Appl. No.: 09/928,207

(22) Filed: Aug. 10, 2001

(51) Int. Cl.[7] ............................................. G06F 11/00
(52) U.S. Cl. ...................................... 714/14; 714/22
(58) Field of Search ................................ 714/14, 22

(56) References Cited

U.S. PATENT DOCUMENTS 5,581,724 A * 12/1996 Belsan et al. ............... 711/114
5,640,530 A *  6/1997 Beardsley et al. ........... 711/113
5,708,771 A *  1/1998 Brant et al. .................. 714/22
5,771,367 A *  6/1998 Beardsley et al. ........... 711/162
6,018,204 A *  1/2000 Kuruma ....................... 307/64

* cited by examiner

*Primary Examiner*—Bryce P. Bonzo
(74) *Attorney, Agent, or Firm*—Chapin & Huang, L.L.C.; David E. Huang, Esq.

(57) ABSTRACT

An electronic system has critical circuitry, non-critical circuitry having a first section and a second section, and a power sub-system. The power sub-system has a first power assembly, a second power assembly, and a set of connections. The set of connections is configured to connect the first and second power assemblies to the critical circuitry and the non-critical circuitry such that, when the first and second power assemblies operate to power the critical and non-critical circuitry through the set of connections, (i) a failure of only the second power assembly results in the first power assembly continuing to power the critical circuitry and the first section of the non-critical circuitry, and (ii) a failure of only the first power assembly results in the second power assembly continuing to power the critical circuitry and the second section of the non-critical circuitry.

25 Claims, 6 Drawing Sheets

METHODS AND APPARATUS FOR PROVIDING POWER TO ELECTRONIC CIRCUITRY

BACKGROUND OF THE INVENTION

A typical computer system includes, among other things, a processor, memory (volatile and non-volatile), and a power supply. The processor runs programs (e.g., an operating system, high-level applications, etc.) which are typically stored in the memory. The power supply powers circuitry within the processor and the memory.

Some computer systems are configured to perform specialized operations. For example, a typical data storage system is a specialized computer system which is configured to perform load and store operations on behalf of one or more external hosts. Such a data storage system can include additional or enhanced computer components for performing the load and storage operations. In particular, some of the volatile memory of a data storage system is typically configured to operate as an input/output (I/O) cache (i.e., cache memory) for temporarily buffering data exchanged between the external hosts and the non-volatile memory (e.g., disk drives).

Some data storage systems include fault tolerant features. For example, one conventional data storage system requires two power supplies to satisfy its entire power needs, but includes three power supplies in the event one of the three power supplies fails. That is, if one of the three power supplies fails, the remaining two power supplies can continue to provide power so that the data storage system remains operational indefinitely, i.e., so that the data storage system can continue storing and retrieving data on behalf of the external hosts. If one of the remaining two power supplies fails, the data storage system cannot continue operating indefinitely and employs a battery backup sub-system for a short period of time in order to shutdown safely without losing any data.

The above-described fault tolerant approach to providing power to a computer system using one more power supply than is overall necessary is called using an N+1 redundancy approach. This approach is appropriately named because it uses the number of power supplies needed to properly power the entire system (N) plus an extra power supply. As such, even if one power supply fails, the system can remain operational.

SUMMARY OF THE INVENTION

Unfortunately, there are deficiencies to the above-identified conventional approach to powering a computer system which simply uses N+1 redundancy. For example, the data storage system cannot remain operational indefinitely when more than one power supply fails. Rather, the data storage system must switch to a battery backup sub-system and shutdown in order to avoid losing data. When this occurs, the hosts can no longer store and retrieve data using the data storage system.

In contrast to the above-identified conventional approaches to powering a computer system which simply uses N+1 redundancy, an embodiment of the invention is directed to techniques for powering an electronic system that can distinguish between critical and non-critical circuitry within the system. A first power assembly and a second power assembly provide power to the critical and non-critical circuitry such that a failure of one power assembly results in the remaining power assembly continuing to power the critical circuitry and a portion of the non-critical circuitry in order to continue operation. Each power assembly can include one or more redundant power supplies (e.g., each power assembly having N+1 redundancy) so that, even if an entire power assembly fails and one or more power supplies in the remaining power assembly fails (i.e., even if the system encounters multiple power supply failures), the electronic system can remain operational.

One arrangement of the invention is directed to an electronic system having critical circuitry, non-critical circuitry having a first section and a second section, and a power sub-system. The power sub-system has a first power assembly, a second power assembly, and a set of connections. The set of connections is configured to connect the first and second power assemblies to the critical circuitry and the non-critical circuitry such that, when the first and second power assemblies operate to power the critical and non-critical circuitry through the set of connections, (i) a failure of only the second power assembly results in the first power assembly continuing to power the critical circuitry and the first section of the non-critical circuitry, and (ii) a failure of only the first power assembly results in the second power assembly continuing to power the critical circuitry and the second section of the non-critical circuitry. Accordingly, the system can sustain a failure of an entire power assembly but maintain operation by continuing to power the critical circuitry and a portion of the non-critical circuitry with the remaining power assembly.

In one arrangement, the first section of the non-critical circuitry includes a first set of storage devices, and the second section of the non-critical circuitry includes a second set of storage devices. In this arrangement, the electronic system operates as a data storage system that stores data into and retrieves data from the first and second sets of storage devices on behalf of a host (e.g., an external computer). The critical circuitry includes cache memory that temporarily buffers data exchanged between the host and the first and second sets of storage devices. Accordingly, a failure of one of the power assemblies still results in the remaining power assembly providing power to the cache memory in order to avoid losing data in the cache memory.

In one arrangement, the second set of storage devices is configured to mirror data on the first set of storage devices. As a result, a failure of one of the power assemblies can result in lost access to one of the sets of storage devices but maintained access to all of the data since the data is mirrored in the other set of storage devices.

In one arrangement, each section of non-critical circuitry includes a front-end interface that operates as an interface between the host and the cache memory, and a first back-end interface that operates as an interface between the cache memory and the first set of storage devices. Accordingly, after a failure of one of the power assemblies, the remaining section of non-critical circuitry (i.e., the section powered by the remaining power assembly) can provide the host with a complete access path to data stored within the storage devices (through the remaining operational front-end interface, cache memory and operational back-end interface).

In one arrangement, the power sub-system includes a first interconnect (e.g., a backplane) that electrically connects to the first set of storage devices, a second interconnect that electrically connects to the second set of storage devices, and a third interconnect that electrically connects to the cache memory, the first front-end and back-end interfaces, and the second front-end and back-end interfaces. The power sub-system further includes a first bus bar assembly that electrically connects the first power assembly to the first and third interconnects, and a second bus bar assembly that electrically connects the second power assembly to the second and third interconnects. Accordingly, both power assemblies have an electrical pathway to the cache memory and to a respective set of storage devices.

In one arrangement, each power assembly includes multiple power supplies (e.g., six power supplies). However, less than all of the multiple power supplies are required to power the critical circuitry and a respective section of the non-critical circuitry (e.g., only four are required). Accordingly, the electronic system can sustain a failure of all of the power supplies in one power assembly, and at least one power supply on the other assembly (e.g., a failure of two power supplies out of six to leave four which are required) and still remain operational.

In one arrangement, the electronic system further includes a switch which is interconnected between the first and second power assemblies. The switch enables voltage balancing of the outputs of the first and second power assemblies.

In one arrangement, the electronic system is configured to connect to four different power feeds. In particular, the first power assembly of the power sub-system includes a first set of main power line connectors to connect to a first main power feed, and a first set of auxiliary power line connectors to connect to a first auxiliary power feed. Similarly, the second power assembly of the power sub-system includes a second set of main power line connectors to connect to a second main power feed, and a second set of auxiliary power line connectors to connect to a second auxiliary power feed. Accordingly, access to multiple power feeds can be lost (e.g., access to three of the power feeds can be lost) but the electronic system can remain operational through the remaining power feed.

In one arrangement, the first section of the non-critical circuitry further includes a first fan assembly that removes heat from the first section of the non-critical circuitry, and a second fan assembly that removes heat from the second section of the non-critical circuitry. The second section of the non-critical circuitry further includes a third fan assembly that removes heat from the first section of the non-critical circuitry, and a fourth fan assembly that removes heat from the second section of the non-critical circuitry. Accordingly, both the first and second sections of non-critical circuitry can receive cooling from a fan assembly even if one of the power assemblies becomes unavailable.

In one arrangement, the first section of the non-critical circuitry further includes a first service processor that provides user access and control to the electronic system, and the second section of the non-critical circuitry further includes a second service processor that provides user access and control to the electronic system. Accordingly, a service processor is available to provide a user (e.g., a technician) with access and control to the electronic system even if one of the power assemblies fails.

The features of the invention, as described above, may be employed in computerized systems, devices and methods as well as other electronic components such as those of EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An embodiment of the invention is directed to techniques for powering an electronic system having critical and non-critical circuitry. A first power assembly and a second power assembly provide power to the critical and non-critical circuitry such that a failure of one power assembly results in the remaining power assembly continuing to power the critical circuitry and a portion of the non-critical circuitry in order to continue operation. Each power assembly can include one or more redundant power supplies (e.g., each power assembly having N+1 redundancy) so that, even if an entire power assembly fails and one or more power supplies in the remaining power assembly fails (i.e., even if the system encounters multiple power supply failures), the electronic system can remain operational.

Figure 1:
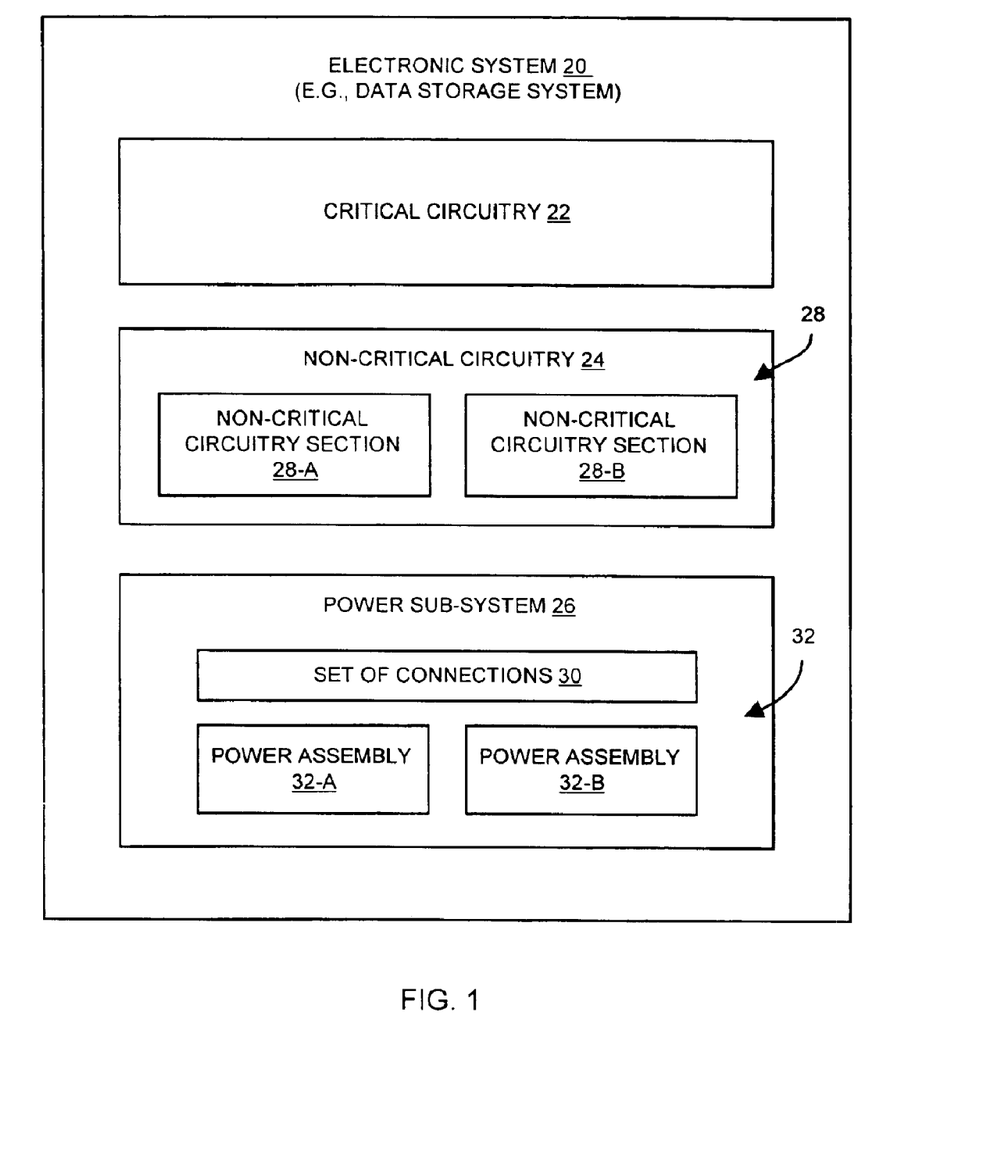
FIG. 1 is a block diagram of an electronic system which is suitable for use by the invention.

FIG. 1 shows an electronic system 20 which is suitable for use by the invention. The electronic system 20 includes critical circuitry 22, non-critical circuitry 24 and a power sub-system 26. The non-critical circuitry 24 includes multiple sections 28-A, 28-B of the non-critical circuitry 24 (collectively, non-critical circuitry sections 28). The power sub-system 26 includes a set of connections 30 and multiple power assemblies 32-A, 32-B (collectively, power assemblies 32). Each power assembly 32-A, 32-B (e.g., an assembly of multiple power supply units) is configured to provide power to the critical circuitry 22 and one of the non-critical circuitry sections 28-A, 28-B through the set of connections 30. For example, the power assembly 32-A is configured to provide power to the critical circuitry 22 and the non-critical circuitry 32-A. Similarly, the power assembly 32-B is configured to provide power to the critical circuitry 22 and the non-critical circuitry 32-B.

The power assemblies 32 are configured such that, when one power assembly 32 fails, the other power assembly 32 can remain operational. Accordingly, when one power assembly 32 fails (e.g., the power assembly 32-A), the other power assembly 32 (e.g., the power assembly 32-B) can continue providing power to the critical circuitry 22 and a section of non-critical circuitry 28 (e.g., the non-critical circuitry section 28-B) thus enabling the electronic system 20 to remain in operation. Further details of the invention will now be provided with reference to FIG. 2.

Figure 2:
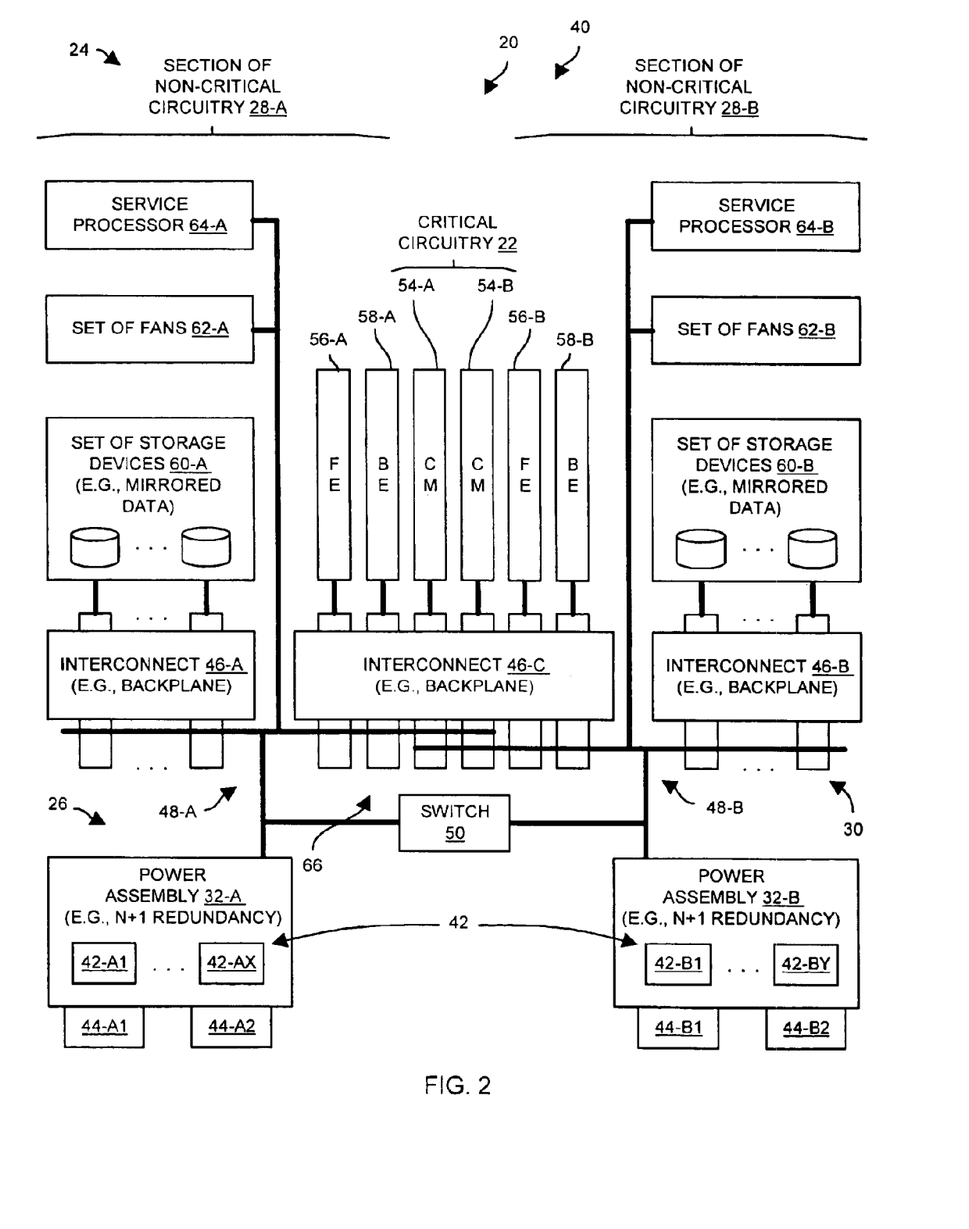
FIG. 2 is a block diagram of particular details of the electronic system of FIG. 1.

FIG. 2 shows particular portions 40 of the electronic system 20. As shown, each power assembly 32-A, 32-B of the power sub-system 26 includes multiple power supply units 42, or simply power supplies. In particular, the power assembly 32-A includes X power supplies 42-A1, . . . , 42-AX, and the power assembly 32-B includes Y power supplies 42-B1, . . . , 42-BY, where both X and Y are positive integers greater than 1. In one arrangement, each power assembly 32-A, 32-B includes the same number of power supplies 42 (i.e., X equals Y).

Additionally, each power assembly 32-A, 32-B includes two sets of power line connectors. In particular, the power assembly 32-A includes a set of main power line connectors 44-A1 for connecting to a main power feed (e.g., a main service leading to a power plant, a generator, etc.), and a set of auxiliary power line connectors 44-A2 for connecting to an auxiliary power feed. Similarly, the power assembly 32-B includes a set of main power line connectors 44-B1 for connecting to a main power feed, and a set of auxiliary power line connectors 44-B2 for connecting to an auxiliary power feed. Preferably, each of the feeds is from a different independent power source so that the power sub-system 26 connects to four independent power sources. As such, each power assembly 32-A, 32-B connects to both a main power source (i.e., the main power feed) and a fallback or redundant power source (i.e., the auxiliary power feed).

Furthermore, the set of connections 30 of the power sub-system 26 includes a set of bus bar assemblies 48-A, 48-B and a set of interconnects 50-A, 50-B, 50-C (e.g., backplanes, cables, adaptors, combinations thereof, etc.) to connect the power assemblies 32-A, 32-B to the critical circuitry 22 and the non-critical circuitry 24. Although only single lines are shown in FIG. 2, it should be understood that the set of connections 30 include multiple conductive paths for carrying current (i.e., a forward path and a return path).

In one arrangement, the power sub-system 30 includes a switch 50 that, when closed, balances the voltage provided by the power assemblies 32-A, 32-B. Preferably, the power assemblies 32-A, 32-B are shipped pre-configured and adjusted so that little or no current flows through the switch 50. In another arrangement, the power sub-system 30 includes a non-switching connecting member that connects the power assemblies 32-A, 32-B and that operates as if the switch 50 of the earlier-described arrangement is always on. In yet another arrangement, the power assemblies 32-A, 32-B are not connected to each other but precisely matched at the factory so that their voltage outputs are substantially the same.

By way of example only, the electronic system 20 is constructed and arranged as a data storage system. As such, the critical circuitry 22 of the system 20 includes a set of memory modules 54-A, 54-B (e.g., memory circuit boards) which form the cache memory of the data storage system. The non-critical circuitry 24 includes other components such as processors (e.g., directors) and non-volatile storage. In particular, as shown in FIG. 2, the section 28-A of the non-critical circuitry 24 includes a front-end interface 56-A (e.g., a circuit board), a back-end interface 58-A (e.g., another circuit board), a set of storage devices 60-A, a set of fans 62-A and a service processor 64-A. The front-end interface 56-A operates as an interface between one or more external hosts and the cache memory. The back-end interface 58-A operates as an interface between the cache memory and the set of storage devices 60-A. The set of fans 62-A provides air streams that remove heat from the electronic system 20. The service processor 64-A operates as an I/O device (e.g., a console) that provides a user with access to and control of the data storage system.

Similarly, and as further shown in FIG. 2, the section 28-B of the non-critical circuitry 24 includes a front-end interface 56-B (e.g., a circuit board), a back-end interface 58-B (e.g., another circuit board), a set of storage devices 60-B, a set of fans 62-B and a service processor 64-B. The critical circuitry 22 and the components of the non-critical circuitry section 28-B are configured operate as a data storage system in a manner that is similar to the critical circuitry 22 and the non-critical circuitry section 28-A. In particular, the front-end interface 56-B operates as an interface between one or more external hosts and the cache memory. The back-end interface 58-B operates as an interface between the cache memory and the set of storage devices 60-B. The set of fans 62-B provides air streams that remove heat from the electronic system 20. The service processor 64-B operates as an I/O device (e.g., a console) that provides a user with access to and control of the data storage system.

As shown in FIG. 2, each of the interconnects 50-A, 50-B, 50-C includes multiple columns of connectors 66. For example, the interconnect 50-A includes columns of connectors 66 that connect to the storage devices 60-A. Similarly, the interconnect 50-B includes columns of connectors 66 that connect to the storage devices 60-B. The interconnect 50-C includes a column of connectors 66 that connects to the front-end interface 56-A, a column of connectors 66 that connects to the back-end interface 56-A, columns of connectors 66 that connect to the memory modules 54-A, 54-B, a column of connectors 66 that connects to the front-end interface 56-B, and a column of connectors 66 that connects to the back-end interface 56-B.

As further shown in FIG. 2, the bus bar assemblies 48-A, 48-B connect to the columns of connectors 66 in order to provide power to the various components (i.e., to the storage devices 60-A, 60-B, front-end interfaces 56-A, 56-B, back-end interfaces 58-A, 58-B, memory modules 54-A, 54-B, etc.). In particular, the bus bar assembly 48-A connects to all of the columns of connectors 66 of the interconnect 46-A in order to carry current between the storage devices 60-A and the power assembly 32-A. Additionally, the bus bar assembly 48-A connects the columns of connectors 66 of the interconnect 46-C which connect to the front-end interface 56-A, the back-end interface 58-A, and the memory modules 54-A, 54-B in order to carry current between those components and the power assembly 32-A.

Similarly, the bus bar assembly 48-B connects to all of the columns of connectors 66 of the interconnect 46-B in order to carry current between the storage devices 60-B and the power assembly 32-B. Furthermore, the bus bar assembly 48-B connects the columns of connectors 66 of the interconnect 46-C which connect to the front-end interface 56-B, the back-end interface 58-B, and the memory modules 54-A, 54-B in order to carry current between those components and the power assembly 32-B.

As mentioned earlier, one of the power assemblies 32-A, 32-B can fail and the electronic system 20, which is configured to operate as a data storage system, can remain operational indefinitely. For example, suppose that the power assembly 32-A fails but that the power assembly 32-B does not fail (i.e., continues to provide power). The section of non-critical circuitry 28-A, which was powered by that power assembly 32-A, can switch to a battery backup sub-system (not shown) in order to remain in operation for a short period of time to flush out any uncompleted data transfer operations and then shutdown in a controlled, stable and intended manner. Concurrently, the power assembly 32-B continues to provide power to the critical circuitry 22 and the non-critical circuitry section 28-B thus enabling the electronic system 20 to continue to store and retrieve data on behalf on one or more hosts (i.e., thus enabling the system to continue as if nothing failed from the perspective of the hosts). That is, the critical circuitry 22 and the non-critical circuitry section 28-B are configured to operate as a complete data storage system since a complete operating pathway exists through the front-end interface 56-B, the memory modules 54-A, 54-B, the back-end interface 58-B and the set of storage devices 60-B. Accordingly, the system 20 can continue operation by storing and retrieving data on behalf of one or more external hosts even if the power assembly 32-A becomes unavailable.

As just mentioned, the critical circuitry 22 and the non-critical circuitry section 28-B are configured to operate as a complete data storage system by storing and retrieving data on behalf of one or more external hosts even when the power assembly 32-A is lost. The remaining section of non-critical circuitry 28-B includes (among other things) an operational front-end interface 56-B, an operational back-end interface 58-B, an operational set of storage devices 60-B thus providing a complete access path between the external host and non-volatile storage for continued operation. It should be further understood that the set of fans 62-B and the service processor 64-B continue to receive power from the power assembly 32-B and continue to operate as well. Since the critical circuitry 22 and the non-critical circuitry section 28-B continue to receive power from the remaining power assembly 32-B, no data is lost and no data transfer operations are affected.

Now further suppose that the power supply 42-B1 of the power assembly 32-B fails. Since each of the power assemblies 32-A, 32-B included at least one redundant power supply for fault tolerance (e.g., N+1 redundancy), the power assembly 32-B can continue to provide power to the electronic system 20, and the electronic system 20 can remain in operation.

In one arrangement, the set of storage devices 60-B mirrors data stored in the set of storage devices 60-A. That is, each set of storage devices 60-A, 6-B includes a full copy of the data in the data storage system. Accordingly, a failure of one of the power assemblies 60-A, 60-B results in lost access to only one of the sets of storage devices 60-A, 60-B but maintained access to all of the data since the data is mirrored in the other set of storage devices 60-A, 60-B. In one arrangement, the data storage system continues operation by storing and retrieving data using the remaining set of storage devices 60-A, 60-B. When the failed power assembly 60-A, 60-B is repaired or replaced, the remaining set of storage devices 60-A, 60-B can be synchronized with the lost set of storage devices 60-A, 60-B to restore data mirroring. Further details of the invention will now be provided with reference to FIG. 3.

Figure 3:
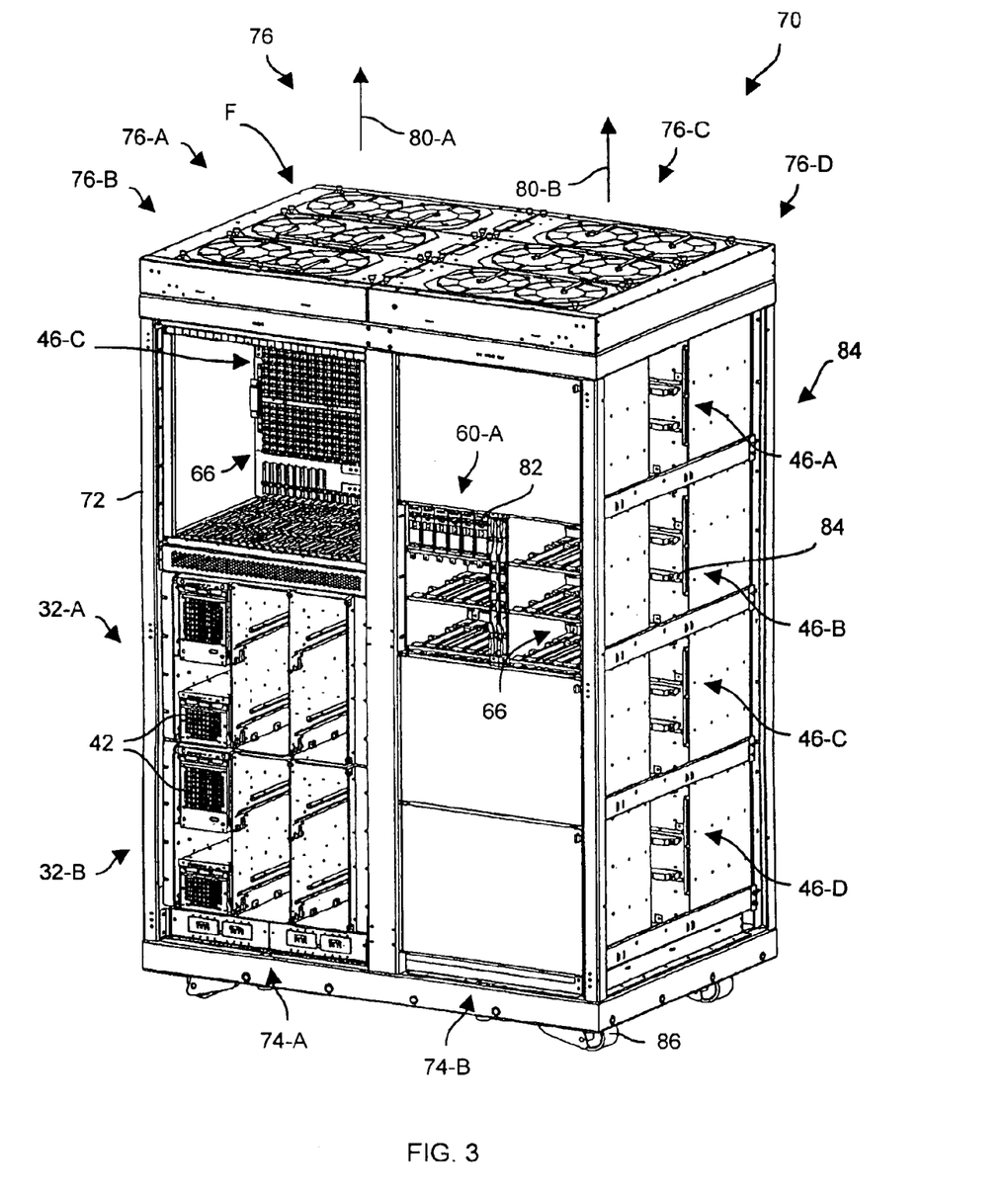
FIG. 3 is a perspective view of portions of the electronic system of FIG. 1.

FIG. 3 shows a perspective view a portion 70 of the electronic system 20. The portion 70 includes a cabinet frame 72 for housing particular circuit components of the electronic system 20. The cabinet frame 72 divides the interior frame cavity into multiple sub-cavities 74-A, 74-B. By way of example only, the power assemblies 32-A, 32-B, the interconnect 46-C, and the circuit boards which connect to the interconnect 46-C (i.e., the interfaces 56-A, 56-B, 58-A, 58-B and the memory modules 54-A, 54-B) reside in the sub-cavity 74-A. The circuit boards and some of the power supplies 42 are omitted from FIG. 3 for simplicity and in order to show other details of the system 20 such as the columns of connectors 66 of the interconnect 46-C.

Also by way of example only, the interconnects 46-A, 46-B and the sets of storage devices 60-A, 60-B which connect to the interconnects 46-A, 46-B reside in the sub-cavity 74-B. By way of example only, the sets of storage devices 60-A, 60-B include disk drive assemblies 82, i.e., a disk drives mounted within disk drive carriers. Some of the storage devices 46-A, 46-B are also omitted from FIG. 3 for simplicity and to show the columns of connectors 66 for connecting to the storage devices 46-A, 46-B. By way of example only, the system 20 further includes additional interconnects 46-D, 46-E for expandability (e.g., for adding non-volatile storage space in the future).

As further shown in FIG. 3, fan assemblies 76-A, 76-B, 76-C, 76-D are formed from the sets of fans 62-A, 62-B (see FIG. 2) and operate as a cooling sub-system for the electronic system 20. The fan assemblies 76-A, 76-B reside at the top of the sub-cavity 74-A. In particular, there are six fans F overall for generating an air stream 80-A therethrough to cool the circuitry housed within the sub-cavity 74-A. Similarly, the fan assembly 76-C, 76-D reside at the top of the sub-cavity 74-B. There are six fans F overall as well for generating an air stream 80-B therethrough to cool the circuitry housed within the sub-cavity 74-B. In one arrangement, sufficient air flow to cool the components within each sub-cavity 74-A, 74-B can be generated by only half the number of fans atop each sub-cavity 74-A, 74-B. That is, only three fans F of the fan assemblies 76-A, 76-B need to run to sufficiently generate the air stream 80-A, and only three fans F of the fan assemblies 76-C, 76-D need to run to sufficiently generate the air stream 80-B.

It should be understood that the frame 72 can include other components in addition to the above-described electronic components. For example, additional electronic components can be housed in the backside 84 of the frame 72. Additionally, wheels 86 can be fastened to the bottom of the frame 72 in order to facilitate moving the frame 72 from one location to another. Further details of the invention will now be provided with reference to FIG. 4.

Figure 4:
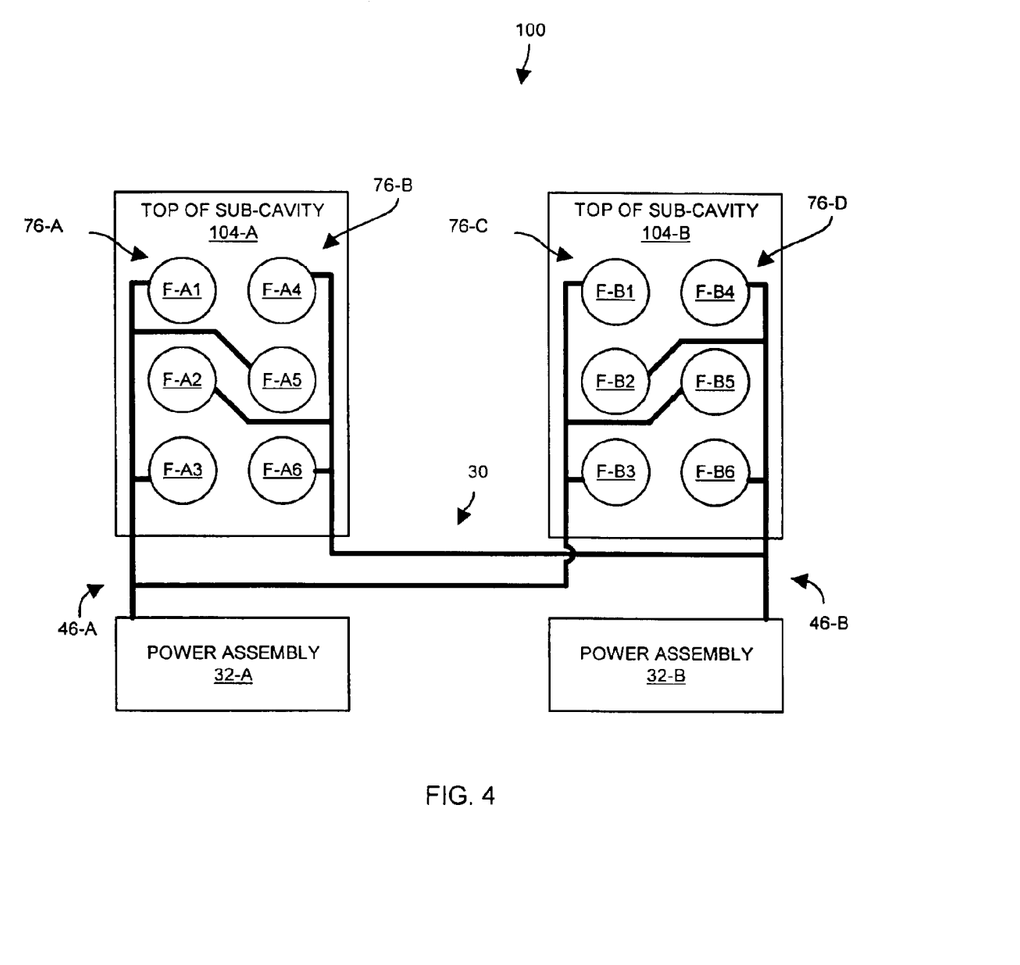
FIG. 4 is a block diagram of a cooling sub-system of the electronic system of FIG. 1.

FIG. 4 shows a portion 100 of the electronic system 20. As shown, a 2×3 array of fans F resides at the sub-cavity top 104-A. The 2×3 array of fans F at the sub-cavity top 104-A is formed by the fan assemblies 76-A, 76-B. The fan assembly 76-A includes fans F-A1, F-A3 and F-A5 of the set of fans 62-A (also see FIG. 2). The fan assembly 76-B includes F-A2, F-A4 and F-A6 of the set of fans 62-B. In one arrangement, the fans F of the fan assemblies 76-A, 76-B are arranged in an interleaved manner as shown in FIG. 4. Since the fans F-A1, F-A3 and F-A5 of the fan assembly 76-A belong to the set of fans 62-A, the fans F-A1, F-A3 and F-A5 are powered by the power assembly 32-A. Similarly, since the fans F-A2, F-A4 and F-A6 of the fan assembly 76-B belong to the set of fans 62-B, the fans F-A2, F-A4 and F-A6 are powered by the power assembly 32-B (see FIG. 2).

Similarly, a 2×3 array of fans F resides at the sub-cavity top 104-B. The 2×3 array of fans at the sub-cavity top 104-B is formed by the fan assemblies 76-C, 76-D. The fan assembly 76-C includes fans F-B1, F-B3 and F-B5 of the set of fans 62-A. The fan assembly 76-D includes F-B2, F-B4 and F-B6 of the set of fans 62-B. In one arrangement, the fans F of the fan assemblies 76-C, 76-D are arranged in an interleaved manner (FIG. 4). Since the fans F-B1, F-B3 and F-B5 of the fan assembly 76-C belong to the set of fans 62-A, the fans F-B1, F-B3 and F-B5 are powered by the power assembly 32-A. Similarly, since the fans F-B2, F-B4 and F-B6 of the fan assembly 76-D belong to the set of fans 62-B, the fans F-B2, F-B4 and F-B6 are powered by the power assembly 32-B (see FIG. 2).

If one of the power assemblies 32-A, 32-B fails, some fans F will continue to operate such that a sufficient air stream 80-A, 80-B (FIG. 3) flows through each sub-cavity 104-A, 104-B (as well as the sub-cavities 74-A, 74-B, see FIG. 3) for adequate cooling. For example, suppose that the power assembly 32-B fails, but that the power assembly 32-A continues to provide power. In this situation, the fan assemblies 76-B and 76-D, which were powered by the power assembly 32-B, no longer operate. However, the fan assemblies 76-A and 76-C, which are powered by the power assembly 32-A continue to operate. In particular, the fan assembly 76-A, which includes three fans F-A1, F-A3 and F-A5, continues to generate the air stream 80-A which is sufficient to adequately cool the circuitry within the sub-cavity top 104-A and the sub-cavity 74-A (also see FIGS. 2 and 3). Similarly, the fan assembly 76-C, which includes three fans F-B1, F-B3 and F-B5, continues to generate the air stream 80-B which is sufficient to adequately cool the circuitry within the sub-cavity top 104-B and the sub-cavity 74-B (FIGS. 2 and 3). Accordingly, the cooling sub-system 100 continues to properly cool the electronic system 20 even when one of the power assemblies 32-A, 32-B fails. Further details of the invention will now be provided with reference to FIG. 5.

Figure 5:
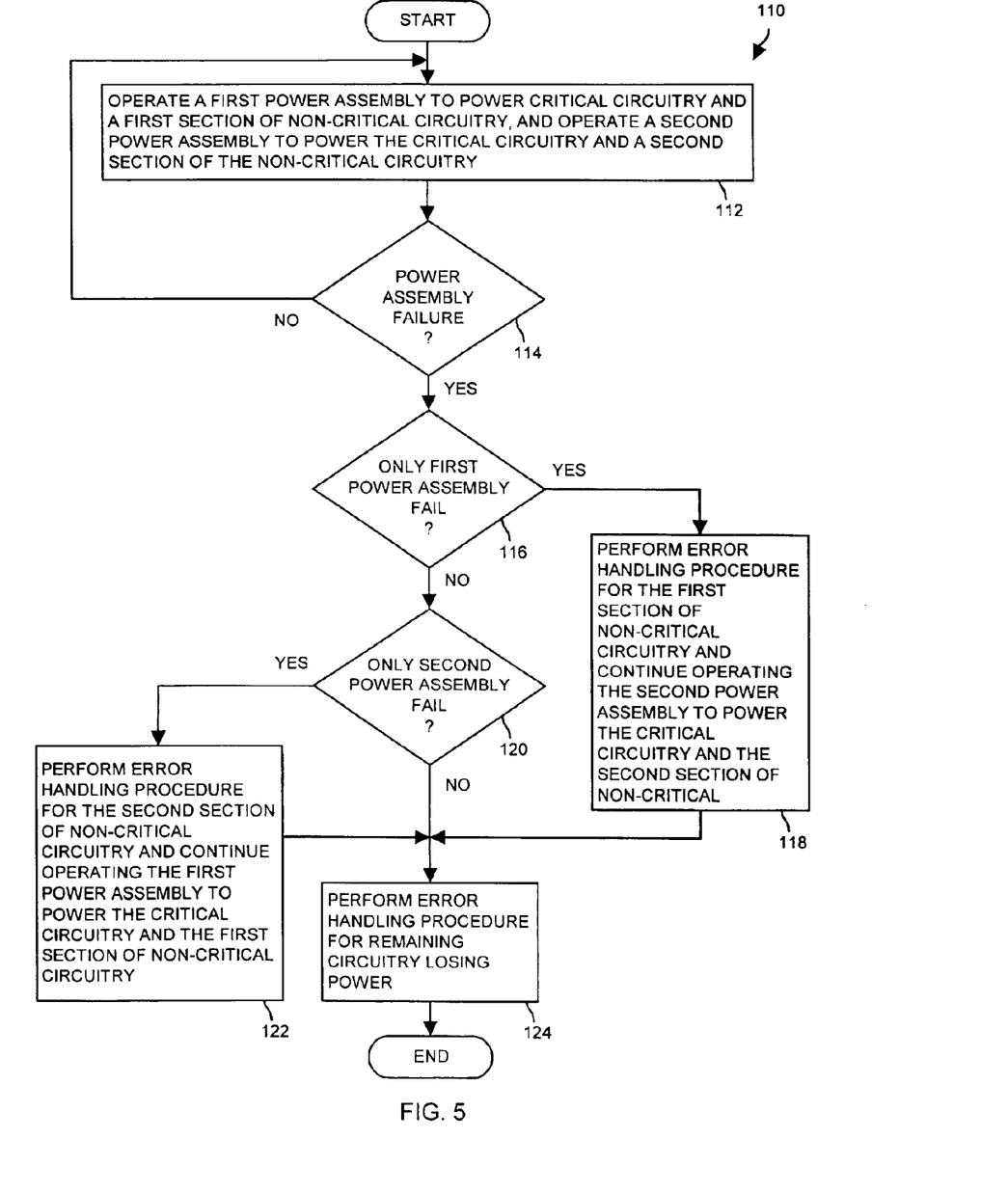
FIG. 5 is a flowchart of a procedure performed by the electronic system of FIG. 1 from a power perspective.

FIG. 5 shows a procedure 110 which is performed by the electronic system 20 from a power perspective. In step 112, the electronic system 20 operates the power assemblies 32-A, 32-B to power the critical circuitry 22 and the non-critical circuitry 24. In particular, the power assembly 32-A provides power to the critical circuitry 22 and the first non-critical circuitry section 28-A (also see FIG. 2). Similarly, the power assembly 32-B provides power to the critical circuitry 22 and the second non-critical circuitry section 28-B.

In step 114, if there is a power assembly failure, step 114 proceeds to step 116. Otherwise (if there is no failure), step 114 returns to step 112 so that the critical circuitry 22 and both non-critical circuitry sections 28-A, 28-B (i.e., the entire system 20) can continue operation.

In step 116, if the first power assembly 32-A failed but the second power assembly 32-B remains in operation, step 116 proceeds to step 118. Otherwise, step 116 proceeds to step 120.

In step 118, the electronic system 20 performs an error handling procedure for the first non-critical circuitry section 28-A and continues operating the critical circuitry and the second non-critical circuitry 28-B. For example, the electronic circuitry 22 can switch to a battery backup system for a short period of time so that any partially completed operations of the first non-critical circuitry section 28-A can be completed and so that the first non-critical circuitry section 28-A can be shutdown in a stable and controlled manner.

In step 120, if the second power assembly 32-B failed but the first power assembly 32-A remains in operation, step 120 proceeds to step 122. Otherwise, step 118 proceeds to step 124.

In step 122, the electronic system 20 performs an error handling procedure for the second non-critical circuitry section 28-B and continues operating the critical circuitry 22 and the first non-critical circuitry 28-A. For example, the electronic circuitry 20 can switch to a battery backup system so that any partially completed operations of the second non-critical circuitry section 28-B can be completed and so that the first non-critical circuitry section 28-A can be shutdown in a stable and controlled manner.

Step 124 is performed after any of steps 120 (when both power assemblies 32-A, 32-B failed simultaneously), 118 (when the first power assembly 32-A fails and then later the second power assembly 32-B fails), 122 (when the second power assembly 32-B fails and then later the first power assembly 32-A fails). In step 124, the electronic system 20 performs an error handling procedure for the circuitry that just lost power. For example, if both power assemblies 32-A, 32-B failed simultaneously (i.e., the electronic system 20 performs steps 114, 116, 118 and 120), the electronic system 20 switches to battery backup so that the critical circuitry 22 and both non-critical circuitry sections 28-A, 28-B are powered to complete any partially performed operations and to shutdown in a stable and controlled manner.

As described above in steps 118 and 122, the electronic system 20 can remain in operation even when one of the power assemblies 32 fails. Further details of the invention will now be provided with reference to FIGS. 2 and 6.

Figure 6:
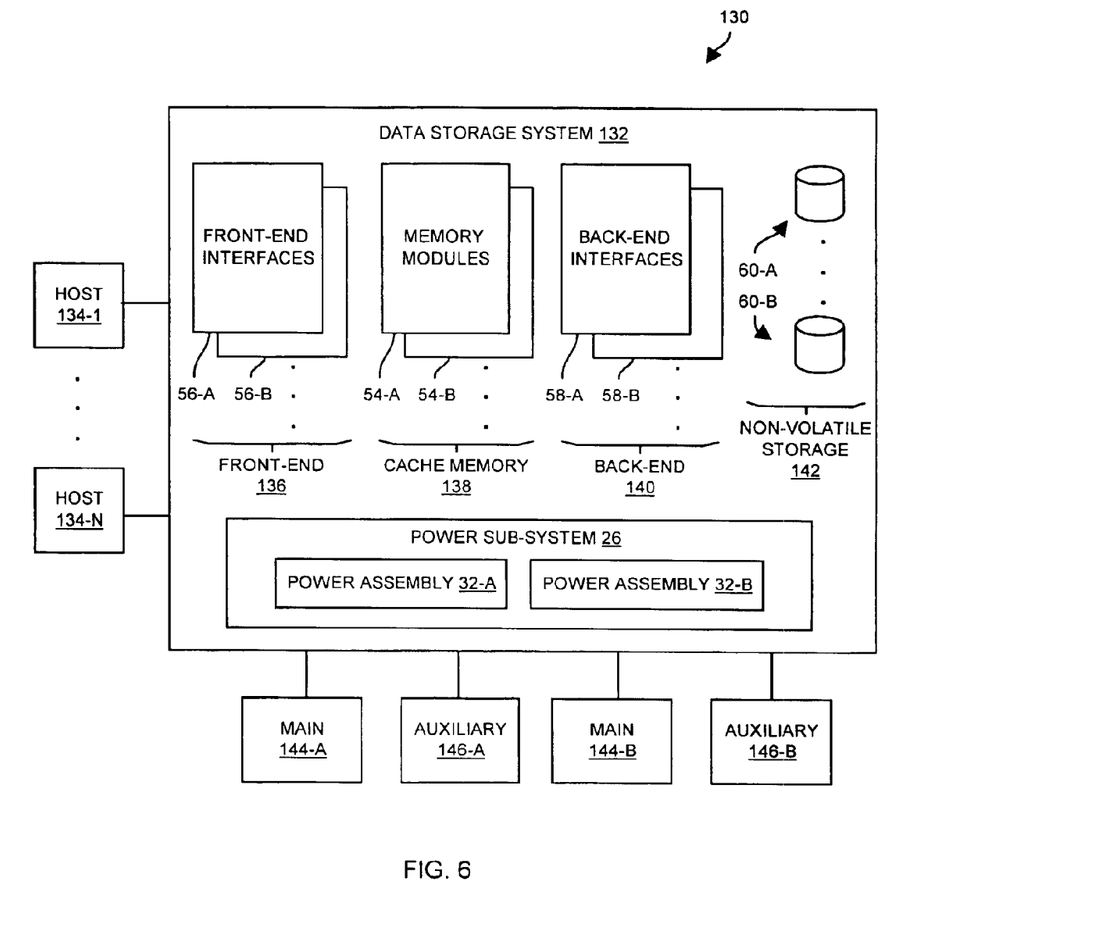
FIG. 6 is the electronic system of FIG. 1 when configured to operate as a data storage system.

As mentioned earlier in connection with FIG. 2 and by way of example, the electronic system 20 can be constructed and arranged as a data storage system. FIG. 6 shows such a data storage system 132 which is capable of performing load and store operations on behalf of one or more external hosts 134-1, . . . , 134-N, e.g., in response to block I/O signals from the hosts 134-1, . . . , 134-N. The front-end interfaces 56-A, 56-B form a front-end 136 of the data storage system 132, the memory modules 54-A, 54-B form a cache memory 138 of the data storage system 132, the back-end interfaces 58-A, 58-B form a back-end 140 of the data storage system 132, and the sets of storage devices 60-A, 60-B (e.g., disk drives) form non-volatile storage 142 of the data storage system 132 (also see FIG. 2). The front-end 136 operates as an interface between the hosts 134-1, . . . , 134-N and the cache memory 138, e.g., transfers blocks of data between the hosts 134-1, . . . , 134-N and the cache memory 138. The back-end 140 operates as an interface between the cache memory 138 and the non-volatile storage 142, e.g., transfers blocks of data between the cache memory 138 and the non-volatile storage 142.

As mentioned earlier in connection with FIG. 2, the power sub-system 32 includes multiple power assemblies 32-A, 32-B and preferably connects to four different power feeds. As shown in FIG. 6, the power sub-system 32 of the data storage system 132 connects to four separate power feeds: a first main power feed 144-A and a first auxiliary power feed 146-A which connect to the power assembly 32-A (through the power lines connectors 44-A1, 44-A2, see FIG. 2), and a second main power feed 144-B and a second auxiliary power feed 146-B which connect to the power assembly 32-B (through the power lines connectors 44-B1, 44-B2, see FIG. 2). Accordingly, a failure of the first main power feed 144-A results in the power assembly 32-A continuing to operate through the first auxiliary power feed 146-A. Similarly, a failure of the second main power feed 144-B results in the power assembly 32-B continuing to operate through the second auxiliary power feed 146-B.

A failure of both the main and auxiliary power feeds to a particular power assembly results in the failure of that power assembly. For example, a failure of the first main and auxiliary power feeds 144-A, 146-A results in the failure of the power assembly 32-A. Nevertheless, in such a situation, the other power assembly 32-B continues operation thus maintaining power to the cache memory 142, a front-end interface 56-B, a back-end interface 58-B, a set of storage devices 60-B, etc. (also see FIG. 2). In particular, the other power assembly 32-B can remain in operation using the auxiliary power feed 146-B even when the main power feed 144-B is lost. Accordingly, the data storage system 132 can continue operation even when multiple power feeds are lost.

Additionally, it should be understood that the data storage system 132 can encounter multiple power supply failures and maintain operation. For example, the data storage system 132 can lose all of the power supplies (e.g., X power supplies) in one power assembly 32-A, 32-B (e.g., the power assembly 32-A). Furthermore, the data storage system can lose one or more power supplies in the other power assembly 32-A, 32-B (e.g., the power assembly 32-B) and that power assembly 32-A, 32-B can remain in operation due to built-in redundancy (e.g., N+1 redundancy). Accordingly, the data storage system 132 is more fault tolerant to power-related failures than the earlier described conventional computer system which employs a simple N+1 redundancy approach and fails completely when more than one power supply fails.

As described above, embodiments of the invention are directed to techniques for powering an electronic system 20 having critical 22 and non-critical circuitry 24. A first power assembly 32-A and a second power assembly 32-B provide power to the critical and non-critical circuitry 22, 24 such that a failure of one power assembly (e.g., the power assembly 32-A) results in the remaining power assembly (e.g., the power assembly 32-B) continuing to power the critical circuitry 22 and a portion 28-B of the non-critical circuitry 24 in order to continue operation. Each power assembly 32-A, 32-B can include one or more redundant power supplies 42 (e.g., each power assembly 32-A, 32-B having N+1 redundancy) so that, even if an entire power assembly 32-A, 32-B fails and one or more power supplies 42 in the remaining power assembly 32-A, 32-B fails (i.e., even if the system encounters multiple power supply failures), the electronic system 20 can remain operational. The features of the invention, as described above, may be employed in data storage systems, apparatus and procedures as well as other computer-related components such as those of EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the electronic system 20 was described above as a data storage system (i.e., a specialized computer system that performs data store and retrieve operations on behalf of hosts) by way of example only. The electronic system 20 can have other configurations and perform other functions as well. For instance, the electronic system 20 can be a general purpose computer, a specialized computer such as a data communications device, a non-processor based apparatus such as a digital logic-designed state machine, a set of application specific integrated circuits (ASICs), a set of field programmable gate arrays (FPGAs), analog circuitry, and/or various combinations thereof. In each of these different configurations, the power system 26 of the electronic system 20 can be arranged so that multiple power assemblies 32-A, 32-B connect to critical circuitry 22 and a respective section 28-A, 28-B of non-critical circuitry 22 so that a failure of a power assembly 32-A, 32-B still enables the remaining power assembly 32-A, 32-B to continue to provide power to the critical circuitry 22 and respective non-critical section 28-A, 28-B of that power assembly 28-A, 28-B for maintained operation of the electronic system 20.

It should be understood that the memory modules 54-A, 54-B were described as being the critical circuitry 22 and other circuits were described as being non-critical circuitry 24 in the above-described data storage system example by way or example only. In other electronic system, different circuitry can reside in the critical circuitry 22 (e.g., processors, controllers, sensors, backup sub-systems, etc.), and different circuitry can reside in the non-critical circuitry 24 (e.g., printers, non-primary sub-systems, etc.).

Additionally, it should be understood that the electronic system 20 was described above as having two power assemblies 32-A, 32-B and two sections 28-A, 28-B of non-critical circuitry 28 by way of example only. Other configurations are suitable as well. For example, the electronic system 20 can have J (e.g., more than two) power assemblies 32 and J non-critical circuitry sections 28. A failure of up to J-1 power assemblies 32 results in at least power assembly 32 remaining in operation to power the critical circuitry 22 and a respective section 28 of noncritical circuitry 24.

Furthermore, it should be understood that the data storage system of FIG. 2 can include more circuit boards than the circuit boards 54-A, 54-B, 56-A, 56-B, 58-A, 58-B shown. For example, the non-critical circuitry section 28-A can include multiple front-end interfaces 56-A and multiple back-end interfaces 58-A for additional throughput and/or redundancy. Similarly, the non-critical circuitry section 28-B can include multiple front-end interfaces 56-B and multiple back-end interfaces 58-B for additional throughput and/or redundancy. Moreover, the critical circuitry 22 can include more memory modules 54-A, 54-B for more buffering of data blocks, redundancy and/or for storing data other than data blocks (e.g., operating system structures, messages exchanged between interfaces, etc.).

Additionally, it should be understood that the data storage system of FIG. 2 was shown as including three interconnects (e.g., backplanes) by way of example only. Other numbers of interconnects are suitable for use as well. For example, as shown in FIG. 3, additional interconnects (e.g., disk drive backplanes) can be added for expandability. Also, backplanes can be coupled together to each other to extend data buses, signal lines, etc. Accordingly, each interconnect can include multiple backplanes which are coupled to each other and which connect to the bus bar assemblies 48-A, 48-B for power.

Furthermore, it should be understood that each power assembly 32-A, 32-B can be configured to provide a single output voltage signal (e.g., +12 VDC), multiple output voltage signals (e.g., +12 VDC, +5 VDC, etc.), direct or alternating currents, etc. For example, in one arrangement, the fans F are powered by an AC output of the power assemblies 32-A, 32-B rather than a DC output. In this arrangement, each of a first fan tray formed by the fan assemblies 76-A, 76-B and a second fan tray formed by the fan assemblies 76-C, 76-D (or alternatively each fan assembly 76-A, 76-B, 76-C, 76-D) preferably includes an AC-DC converting circuit (e.g., two AC-DC converters that step down a 48 Volt output to power a single fan in each tray).

Additionally, it should be understood that the switch 50 is optional. In some arrangements, the switch 50 is omitted or left open in order to assure that a failure on one half of the electronic system 20 will not take both halves of the electronic system 20 down. In one arrangement, in which the switch 50 is present but left open, the option is then available later to use the switch 50 in a subsequent configuration (e.g., an upgrade) that requires more power than that which is provided by a single power assembly 32-A, 32-B. Such modifications and enhancements are intended to be part of embodiments of the invention, and the invention should be limited only by the spirit and scope of the claims.

What is claimed is:

1. An electronic system, comprising:

critical circuitry;

non-critical circuitry having a first section and a second section; and a power sub-system having a first power assembly, a second power assembly, and a set of connections which is configured to connect the first and second power assemblies to the critical circuitry and the non-critical circuitry such that, when the first and second power assemblies operate to power the critical and non-critical circuitry through the set of connections, (i) a failure of only the second power assembly results in the first power assembly continuing to power the critical circuitry and the first section of the non-critical circuitry, and (ii) a failure of only the first power assembly results in the second power assembly continuing to power the critical circuitry and the second section of the non-critical circuitry, wherein X and Y are integers greater than 0; wherein the first power assembly includes multiple first power supplies that perform a normal operating procedure to provide power to the critical circuitry and to the first section of the non-critical circuitry when up to X first power supplies fail, and an error handling procedure to discontinue providing power to the critical circuitry and to the first section of the non-critical circuitry when more than X first power supplies fail; and wherein the second power assembly includes multiple second power supplies that perform a normal operating procedure to provide power to the critical circuitry and to the second section of the non-critical circuitry when up to Y second power supplies fail, and an error handling procedure to discontinue providing power to the critical circuitry and to the first section of the non-critical circuitry when more than Y second power supplies fail.

2. The electronic system of claim 1 wherein the first section of the non-critical circuitry includes a first set of storage devices, wherein the second section of the non-critical circuitry includes a second set of storage devices, wherein the electronic system operates as a data storage system that stores data into and retrieves data from the first and second sets of storage devices on behalf of a host, and wherein the critical circuitry includes cache memory that temporarily buffers data exchanged between the host and the first and second sets of storage devices.

3. The electronic system of claim 2 wherein the second set of storage devices is configured to mirror data on the first set of storage devices.

4. The electronic system of claim 2 wherein the first section of the non-critical circuitry further includes:

a first front-end interface that is configured to operate as an interface between the host and the cache memory, and a first back-end interface that is configured to operate as an interface between the cache memory and the first set of storage devices; and wherein the second section of the non-critical circuitry further includes:

a second front-end interface that is configured to operate as an interface between the host and the cache memory, and a second back-end interface that is configured to operate as an interface between the cache memory and the second set of storage devices.

5. The electronic system of claim 4 wherein the set of connections of the power sub-system includes:

a first interconnect that electrically connects to the first set of storage devices;

a second interconnect that electrically connects to the second set of storage devices;

a third interconnect that electrically connects to the cache memory, the first front-end and back-end interfaces, and the second front-end and back-end interfaces;

a first bus bar assembly that electrically connects the first power assembly to the first and third interconnects; and a second bus bar assembly that electrically connects the second power assembly to the second and third interconnects.

6. The electronic system of claim 5 wherein the third interconnect includes:

a backplane having columns of connectors, each column of connectors electrically connecting to one of the first front-end interface, the first back-end interface, the second front-end interface, the second back-end interface and the cache memory;

wherein the first bus bar assembly includes:

a first bus bar that electrically connects the first power assembly to the columns of connectors that electrically connect to the first front-end interface, the first back-end interface and the cache memory without electrically connecting the first power assembly to the columns of connectors that electrically connect to the second front-end interface and the second back-end interface; and wherein the second bus bar assembly includes:

a second bus bar that electrically connects the second power assembly to the columns of connectors that electrically connect to the second front-end interface, the second back-end interface and the cache memory without electrically connecting to the columns of connectors that electrically connect to the first front-end interface and the first back-end interface.

7. The electronic system of claim 1, further comprising:

a switch which is interconnected between the first and second power assemblies to voltage balance outputs of the first and second power assemblies.

8. The electronic system of claim 1 wherein the first power assembly of the power sub-system includes:

a first set of main power line connectors to connect to a first main power feed which is configured to connect to a power source that is external to the electronic system, and a first set of auxiliary power line connectors to connect to a first auxiliary power feed which is configured to connect to a power source that is external to the electronic system; and wherein the second power assembly of the power sub-system includes:

a second set of main power line connectors to connect to a second main power feed which is configured to connect to a power source that is external to the electronic system, and a second set of auxiliary power line connectors to connect to a second auxiliary power feed which is configured to connect to a power source that is external to the electronic system.

9. The electronic system of claim 1 wherein the first section of the non-critical circuitry further includes:

a first fan assembly that removes heat from the first section of the non-critical circuitry, and a second fan assembly that removes heat from the second section of the non-critical circuitry; and wherein the second section of the non-critical circuitry further includes:

a third fan assembly that removes heat from the first section of the non-critical circuitry, and a fourth fan assembly that removes heat from the second section of the non-critical circuitry.

10. The electronic system of claim 1 wherein the first section of the non-critical circuitry further includes:

a first service processor that provides user access and control to the electronic system; and wherein the second section of the non-critical circuitry further includes:

a second service processor that provides user access and control to the electronic system.

11. The electronic system of claim 1 wherein X equals 1 to configure the first power assembly with N+1 redundancy to provide power to (i) the critical circuitry and (ii) the first section of the non-critical circuitry in response to a failure of exactly 1 first power supply of the first power assembly; and wherein Y equals 1 to configure the second power assembly with N+1 redundancy to provide power to (i) the critical circuitry and (ii) the second section of the noncritical circuitry in response to a failure of exactly 1 second power supply of the second power assembly.

12. The electronic system of claim 1 wherein the set of connectors includes a backplane interconnect having:

a backplane structure;

a first set of connectors, mounted to the backplane structure, which connects directly to at least a portion of the first section of non-critical circuitry;

a second set of connectors, mounted to the backplane structure, which connects directly to at least a portion of the second section of non-critical circuitry; and a third set of connectors, mounted to the backplane structure, which connects directly to the critical circuitry.

13. The electronic system of claim 1 wherein the first section of the noncritical circuitry includes a first set of fans which provides cooling to both the first section and the second section of the non-critical circuitry; wherein the second section of the non-critical circuitry includes a second set of fans which provides cooling to both the first section and the second section of the non-critical circuitry; and wherein fans of the first and second sets of fans are disposed in an interleaved manner.

14. A power system for providing power to electronics including critical circuitry and non-critical circuitry, the power system comprising:

a first power assembly;

a second power assembly; and a set of connections which is configured to connect the first and second power assemblies to the critical circuitry and the non-critical circuitry such that, when the first and second power assemblies operate to power the critical and non-critical circuitry through the set of connections, (i) a failure of only the second power assembly results in the first power assembly continuing to power the critical circuitry and the first section of the non-critical circuitry, and (ii) a failure of only the first power assembly results in the second power assembly continuing to power the critical circuitry and the second section of the non-critical circuitry, wherein X and Y are integers greater than 0; wherein the first power assembly includes multiple first power supplies that perform a normal operating procedure to provide power to the critical circuitry and to the first section of the non-critical circuitry when up to X first power supplies fail, and an error handling procedure to discontinue providing power to the critical circuitry and to the first section of the non-critical circuitry when more than X first power supplies fail; and wherein the second power assembly includes multiple second power supplies that perform a normal operating procedure to provide power to the critical circuitry and to the second section of the non-critical circuitry when up to Y second power supplies fail, and an error handling procedure to discontinue providing power to the critical circuitry and to the first section of the non-critical circuitry when more than Y second power supplies fail.

15. The power system of claim 14 wherein the first section of the non-critical circuitry includes a first set of storage devices, wherein the second section of the non-critical circuitry includes a second set of storage devices, wherein the critical circuitry includes cache memory to temporarily buffer data exchanged between a host and the first and second sets of storage devices, and wherein the set of connections includes:

a first interconnect that is configured to electrically connect to the first set of storage devices;

a second interconnect that is configured to electrically connect to the second set of storage devices;

a third interconnect that is configured to electrically connect to the cache memory;

a first bus bar assembly that electrically connects the first power assembly to the first and third interconnects; and a second bus bar assembly that electrically connects the second power assembly to the second and third interconnects.

16. The power system of claim 15 wherein the first section of non-critical circuitry further includes a first front-end interface which operates as an interface between the host and the cache memory, and a first back-end interface which operates as an interface between the cache memory and the first set of storage devices; wherein the second section of non-critical circuitry further includes a second front-end interface which operates as an interface between the host and the cache memory, and a second back-end interface which operates as an interface between the cache memory and the second set of storage devices; wherein the third interconnect includes:

a backplane having columns of connectors, each column of connectors being configured to electrically connect to one of the first front-end interface, the first back-end interface, the second front-end interface, the second back-end interface and the cache memory;

wherein the first bus bar assembly includes:

a first bus bar that electrically connects the first power assembly to the columns of connectors that are configured to electrically connect to the first front-end interface, the first back-end interface and the cache memory without electrically connecting the first power assembly to the columns of connectors that are configured to electrically connect to the second front-end interface and the second back-end interface; and wherein the second bus bar assembly includes:

a second bus bar that electrically connects the second power assembly to the columns of connectors that are configured to electrically connect to the second front-end interface, the second back-end interface and the cache memory without electrically connecting to the columns of connectors that are configured to electrically connect to the first front-end interface and the first back-end interface.

17. The power system of claim 14, further comprising:
a switch which is interconnected between the first and second power assemblies to voltage balance outputs of the first and second power assemblies.

18. The power system of claim 14 wherein the first power assembly includes:
a first set of main power line connectors to connect to a first main power feed which is configured to connect to a power source that is external to the electronic system, and
a first set of auxiliary power line connectors to connect to a first auxiliary power feed which is configured to connect to a power source that is external to the electronic system; and
wherein the second power assembly includes:
a second set of main power line connectors to connect to a second main power feed which is configured to connect to a power source that is external to the electronic system, and
a second set of auxiliary power line connectors to connect to a second auxiliary power feed which is configured to connect to a power source that is external to the electronic system.

19. The power system of claim 14 wherein X equals 1 to configure the first power assembly with N+1 redundancy to provide power to (i) the critical circuitry and (ii) the first section of the non-critical circuitry in response to a failure of exactly 1 first power supply of the first power assembly; and wherein Y equals 1 to configure the second power assembly with N+1 redundancy to provide power to (i) the critical circuitry and (ii) the second section of the non-critical circuitry in response to a failure of exactly 1 second power supply of the second power assembly.

20. The power system of claim 14 wherein the set of connectors includes a backplane interconnect having:
a backplane structure;
a first set of connectors, mounted to the backplane structure, which connects directly to at least a portion of the first section of non-critical circuitry;
a second set of connectors, mounted to the backplane structure, which connects directly to at least a portion of the second section of non-critical circuitry; and
a third set of connectors, mounted to the backplane structure, which connects directly to the critical circuitry.

21. The power system of claim 14 wherein the first section of the non-critical circuitry includes a first set of fans which provides cooling to both the first section and the second section of the non-critical circuitry; wherein the second section of the non-critical circuitry includes a second set of fans which provides cooling to both the first section and the first and second section of the non-critical circuitry; and wherein fans of the first and second sets of fans are disposed in an interleaved manner.

22. A method for providing power to electronics including critical circuitry and non-critical circuitry, the method comprising the steps of:
operating a first power assembly to power the critical circuitry and a first section of the non-critical circuitry;
operating a second power assembly to power the critical circuitry and a second section of the non-critical circuitry;
in response to a failure of the second power assembly, continuing to power the critical circuitry and the first section of the non-critical circuitry using the first power assembly; and
in response to a failure of the first power assembly, continuing to power the critical circuitry and the second section of the non-critical circuitry using the second power assembly;
wherein X and Y are integers greater than 0; wherein the first power assembly includes multiple first power supplies; wherein the step of operating the first power assembly includes the step of:
performing a first normal operating procedure to provide power to the critical circuitry and to the first section of the non-critical circuitry when up to X first power supplies fail;
wherein the step of operating the second power assembly includes the step of:
performing a second normal operating procedure to provide power to the critical circuitry and to the second section of the non-critical circuitry when up to Y second power supplies fail;
wherein the step of continuing to power the critical circuitry and the first section of the non-critical circuitry using the first power assembly in response to a failure of the second power assembly includes the step of:
performing a first error handling procedure to discontinue providing power to the critical circuitry and to the first section of the non-critical circuitry using the first power assembly when more than X first power supplies fail; and
wherein the step of continuing to power the critical circuitry and the second section of the non-critical circuitry using the second power assembly in response to a failure of the first power assembly includes the step of:
performing a second error handling procedure to discontinue providing power to the critical circuitry and to the first section of the non-critical circuitry using the second power assembly when more than Y second power supplies fail.

23. The method of claim 22, further comprising the step of:
interconnecting the first and second power assemblies through a switch to voltage balance outputs of the first and second power assemblies.

24. The method of claim 22, further comprising the steps of:
connecting a first set of main power line connectors of the first power assembly to a first main power feed;
connecting a first set of auxiliary power line connectors of the first power assembly to a first auxiliary power feed;
connecting a second set of main power line connectors of the second power assembly to a second main power feed; and
connecting a second set of auxiliary power line connectors of the second power assembly to a second auxiliary power feed.

25. An electronic system, comprising:
critical circuitry;
non-critical circuitry having a first section and a second section; and
a power sub-system having:
(a) a first power assembly,
(b) a second power assembly, and
(c) means for connecting the first and second power assemblies to the critical circuitry and the non-critical circuitry such that, when the first and second power assemblies operate to power the critical and non-critical circuitry through the set of connections, (i) a failure of only the second power assembly results in the first power assembly continuing to power the critical circuitry and the first section of the non-critical circuitry, and (ii) a failure of only the first power assembly results in the second power assembly continuing to power the critical circuitry and the second section of the non-critical circuitry, wherein X and Y are integers greater than 0; wherein the first power assembly includes multiple first power supplies that perform a normal operating procedure to provide power to the critical circuitry and to the first section of the non-critical circuitry when up to X first power supplies fail, and an error handling procedure to discontinue providing power to the critical circuitry and to the first section of the non-critical circuitry when more than X first power supplies fail; and wherein the second power assembly includes multiple second power supplies that perform a normal operating procedure to provide power to the critical circuitry and to the second section of the non-critical circuitry when up to Y second power supplies fail, and an error handling procedure to discontinue providing power to the critical circuitry and to the first section of the non-critical circuitry when more than Y second power supplies fail.

* * * * *